June 20, 1933.   H. M. SIEMANN   1,914,621
BEET HARVESTER
Filed March 22, 1932   3 Sheets-Sheet 1
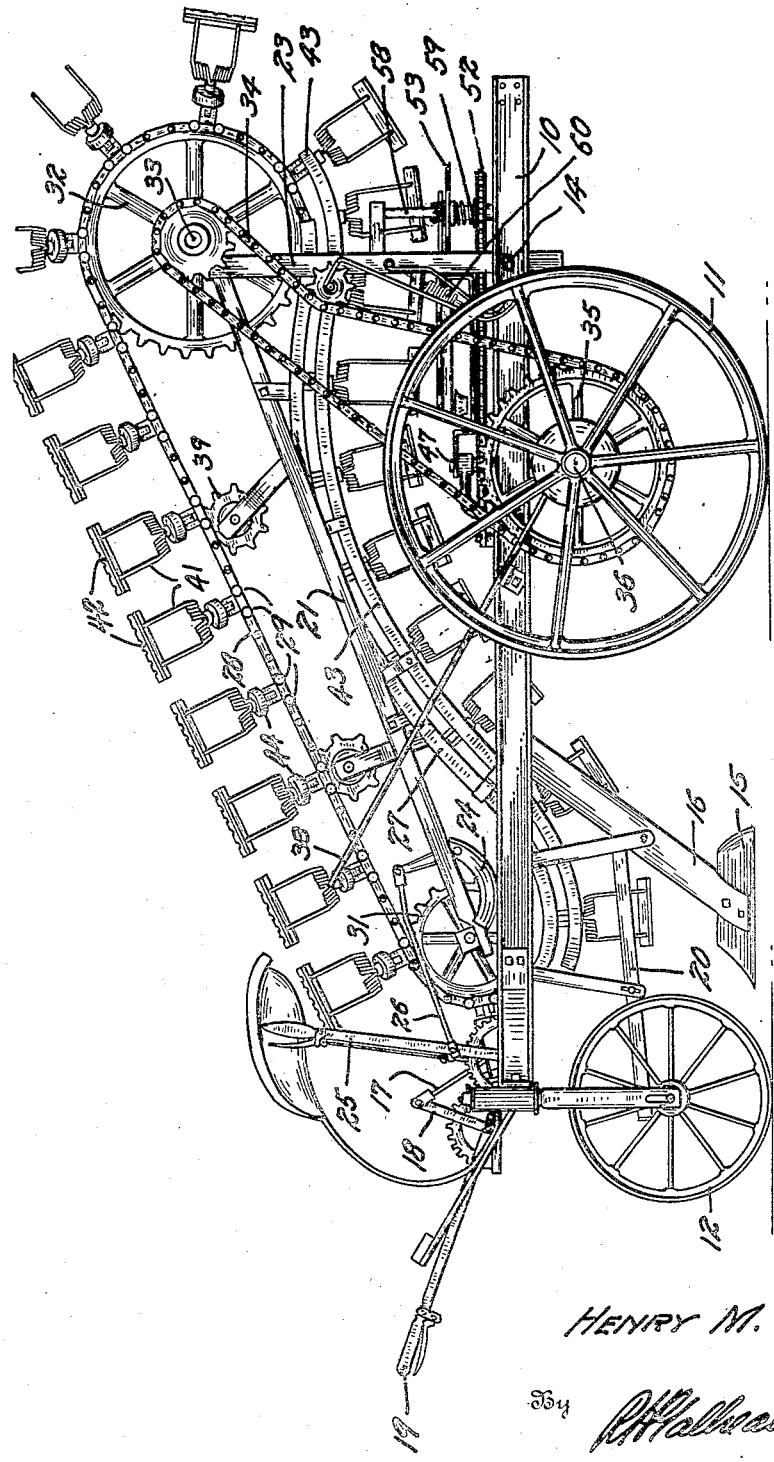
Inventor
HENRY M. SIEMANN
By
Attorney

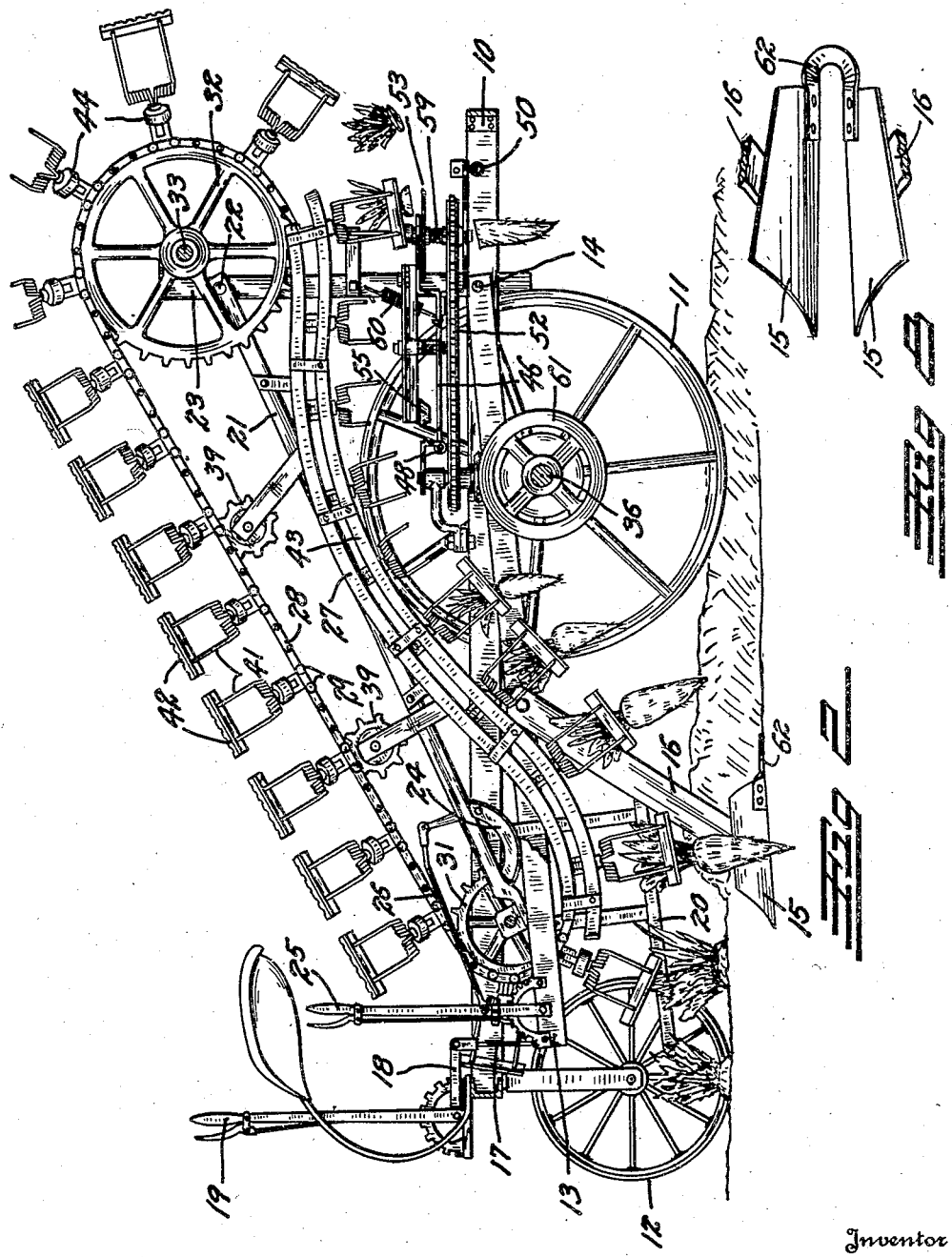

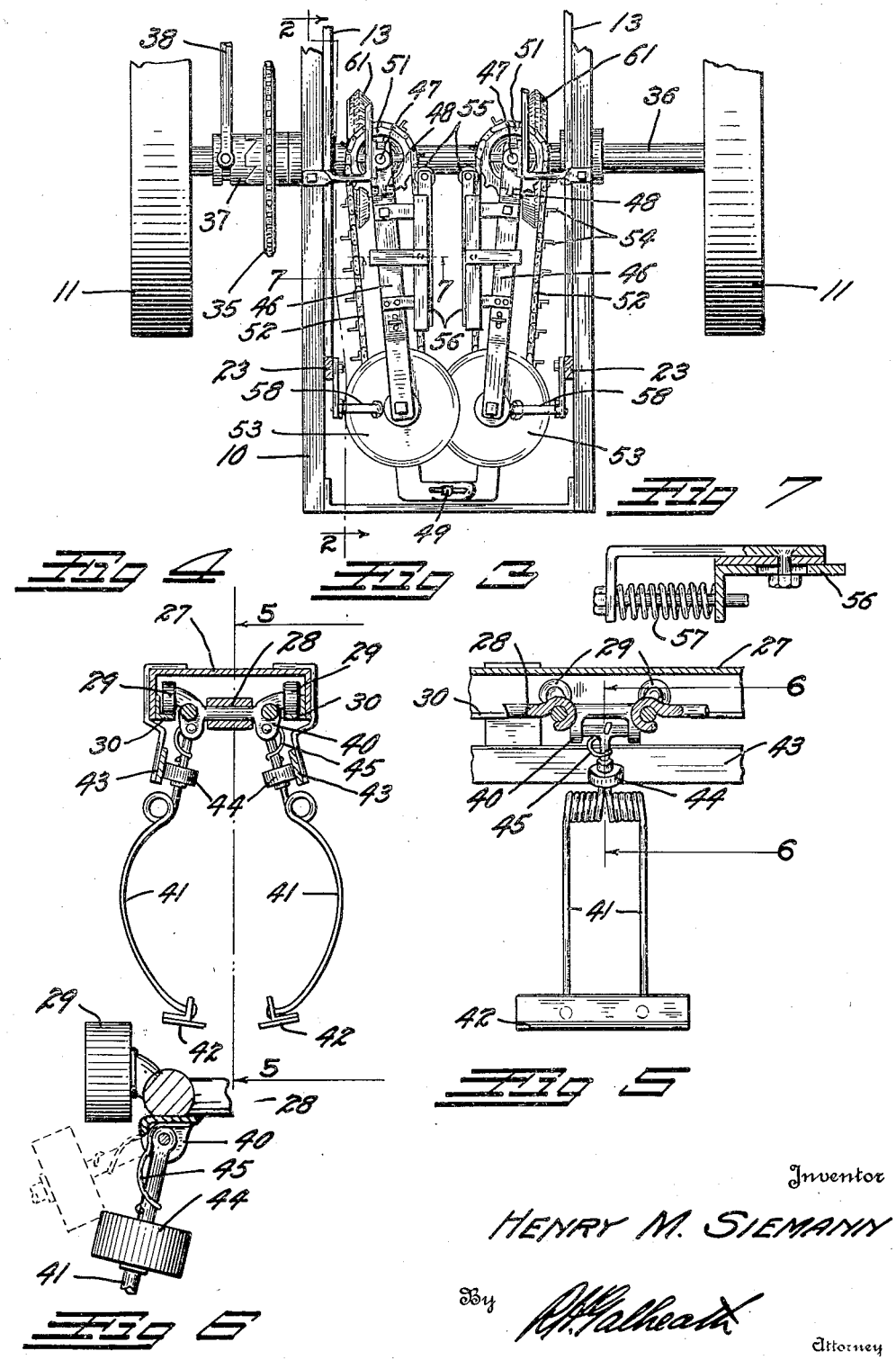

Patented June 20, 1933

1,914,621

UNITED STATES PATENT OFFICE

HENRY M. SIEMANN, OF FORT LUPTON, COLORADO, ASSIGNOR OF FORTY-NINE PER CENT TO EUGENE DE MUTH, OF FORT LUPTON, COLORADO

BEET HARVESTER

Application filed March 22, 1932. Serial No. 600,490.

This invention relates to a beet harvesting machine and has for its principal object the provision of an efficient harvester which will pick up the beets as they are dug and carry them to an aligning device which will automatically align and pass them to cutting knives to remove the tops therefrom.

Another object of the invention is to provide means for grabbing the beets by their foliage or tops and holding them until the tops have been severed therefrom and then releasing the tops.

A further object is to so construct the topping portion of the device that it will automatically cut a deeper top from a large beet than from a small one.

A still further object is to provide an adjustment for the depth of digging independent of an adjustment for the point at which the tops are grabbed and held.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the improved harvester.

Fig. 2 is a longitudinal section therethrough taken on the line 2—2, Fig. 3.

Fig. 3 is a detail plan view of the rear or topping portion of the harvester.

Fig 4 is a detail section through the clamp chain guide track.

Fig. 5 is a longitudinal section through the guide track taken on the line 5—5, Fig. 4.

Fig. 6 is a detail view of the hinge employed in the top clamping mechanism. This view is taken on the line 6—6, Fig. 5.

Fig. 7 is a detail view of the aligning guide spring taken on the line 7—7, Fig. 3.

Fig. 8 is a plan view of the digging plows.

The invention comprises a supporting frame 10 supported at its rear extremity on drive wheels 11 and at its forward extremity on guide wheels 12. The drive wheels are fixed to a rear axle 36. A plow frame 13 is hinged at 14 within the main frame 10. The plow frame 13 supports a pair of beet lifting plows 15 upon the usual plow arms 16. The forward extremity of the plow frame 13 is supported on hangers 17 from crank levers 18 which can be operated by means of a hand lever 19 to raise and lower the forward extremity of the plow frame 13 and regulate the depth at which the plows 15 operate. Top guide arms 20 extend forwardly from the plow arms 16 to pick up and confine the beet tops as the machine approaches them.

A chain frame 21 operates within the plow frame 13. The rearward extremity of the chain frame 21 is pivoted at 22 to a pair of standards 23 which extend upwardly from the main frame 10. The forward extremity of the chain frame 21 is supported from the plow frame 13 upon cams 24 which contact with the plow frame 13 and are carried on a cam shaft journalled upon the frame 21. The cams can be operated so as to raise and lower the forward extremity of the chain frame 21 with reference to the plow frame 13 by means of an operating lever 25 which is connected with the cam shaft through a suitable connecting link 26.

Thus, it will be noted that operation of the hand lever 19 will raise or lower the forward extremities of both the frames 13 and 21 and that operation of the hand lever 25 will only raise or lower the forward extremity of the chain lever 21.

A curved chain track 27 is supported from the chain frame 21. This track serves to guide a link belt or chain 28 in a predetermined path. The links of the chain 28 are provided with rollers 29 which travel in the chain track 27. The chain track is shown more in detail in Fig. 4 and comprises a downwardly opening channel member along the bottom edges of which inwardly turned angle members 30 are placed which serve to support the rollers 29. The chain 28 travels over a forward sprocket 31 which is supported on the forward extremity of the chain frame 21 and is driven from a rear sprocket 32, which is fixed on a sprocket shaft 33 journalled on the standards 23. The upper reach of the chain 28 is supported on suitable idler sprockets 39. The lower reach of the chain 28 travels rearwardly as the machine moves forwardly.

The shaft 33 is driven through the medium of a drive chain 34 from a drive sprocket 35 which rides on the rear axle 36. The drive sprocket can be operatively connected with the rear axle 36 through the medium of a clutch dog 37 which can be operated from the driver's position by means of a clutch handle 38.

Certain of the links of the chain 28 are provided with hinge ears 40 in which resilient spring arms 41 are hinged. The outer extremities of the spring arms 41 carry gripping jaws 42. These gripping jaws are caused to move toward or away from each other by means of side roller bars 43 which engage rollers 44 on the spring arms 41 as the chain travels. The roller bars 43 are supported from the chain track 27. The spring arms 41 are constantly urged outwardly by means of springs 45 and are moved inwardly by the action of the roller bars 43.

In operation, the lifting plows 15 loosen and elevate the beets from the soil as shown in Fig. 2. The spring arms and their gripping jaws move downwardly at each side of the beet tops and when opposite a top, are forced together by means of the roller bars 43 so as to firmly grip the beet top. The resilient spring arms 41 act to cushion the action of the gripping jaws so they engage the tops so that they will automatically accommodate themselves to tops of various size and density. The gripped beets are then elevated, as the chain follows the chain track 27, and carried rearwardly. At the rear of the machine the rollers 44 leave the roller bars 43 and allow the spring arms 41 to snap open to release the beet tops.

It will be noted that the chain track toward the rear of the machine carries the beets in a practically horizontal line and it is at this point that the topping mechanism is located. The topping mechanism comprises a pair of rearwardly extending knife brackets 46 positioned at each side of the path of travel of the beets. The knife brackets 46 are hinged at their forward extremity on vertical shafts 47 so that they can swing laterally. Hinges 48 are incorporated in the brackets 46 so as to allow a vertical movement of their rearward extremities. The combination of the shafts 47 and the hinges 48 provides a universal hinge or mounting that allows the knife brackets 46 to be swung in any desired direction. The two knife brackets 46 are secured together adjacent their rearward extremities by means of a bolt 49 which passes through a slotted opening so as to allow lateral separation of the frames. A spring 50 constantly tends to hold the two brackets 46 toward each other.

The vertical shafts 47 operate chain sprockets 51 from each of which an endless chain 52 extends rearwardly to drive a disc knife 53 journalled adjacent the rear of the brackets 46. The chains 52 are provided with projecting members 54 which serve to assist in drawing the beets rearwardly and forcing them into the knives. As the beets move rearwardly between the chains 52 they are forced between a pair of guide rollers 55. The rollers 55 are carried on the extremities of flexibly mounted guide bars 56. The guide bars 56 are arranged so that they can be forced outwardly against the compression of springs 57, see Fig. 5, which act to cushion their action on the beets.

The guide bars 56 are arranged a sufficient distance below the clamping jaws 42 so that as each beet comes up the chain will be pulled against the bottom of the guide plate 56 so that all beets will be aligned along their tops as they approach the knives 53. If the gripping jaws have caught the top close to the beet the guide bars will tend to pull the beet from the jaws. If tightly held, the brackets 46 will be lifted on the hinges 48 by the beet to properly align the knives therewith. The brackets 46 are flexibly floated on tension springs 60.

It is desirable that the larger beets be cut at a greater depth than the smaller beets. This is accomplished in this machine by a pair of diagonally positioned hinge arms 58 which bear against the knives at their lower extremities and, as the brackets 46 are swung apart by a large beet, they will tend to force the knives downwardly against the compression of knife springs 59 so that the larger beets will be cut at a greater depth. The knives 53 are mounted on a square or splined shaft so that they can move downwardly and still be caused to rotate. As the beet moves between the guide bars 56 it will, if large, tend to force the two brackets 46 outwardly and act to separate the knives 53, the amount of separation depending upon the size of the beet.

The heels of the digging plows 15 are tied together by means of a cross tie member 62 which prevents them from being forced apart by the beets. The gripping jaws lift the beets above this tie member so that it will not interfere with the digging operation.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A beet harvesting machine comprising: a pair of lifting plows adapted to lift the beets from the soil; an endless chain positioned above said plows; gripping jaws carried by said chain and adapted to grip the tops of the beets as they are lifted by said plows and convey them upwardly; means for causing said chain to travel in a predetermined path, said means comprising, a curvilinear track adapted to engage and guide said chain.

2. A beet harvesting machine comprising: a main wheeled frame; a plow frame positioned within said main frame; said plow frame being hinged to said main frame adjacent its rearward extremity; plows depending from said plow frame; adjustable means for supporting the forward extremity of said plow frame from said main frame; a chain frame positioned within said plow frame and hingedly supported adjacent its rearward extremity; adjustable means for supporting the forward extremity of said chain frame; an endless chain supported by said chain frame; and gripping jaws on said chain adapted to engage the tops of the beets as they are dug by said plows.

3. A beet harvesting machine comprising: a main wheeled frame; a plow frame positioned within said main frame; said plow frame being hinged to said main frame adjacent its rearward extremity; plows depending from said plow frame; adjustable means for supporting the forward extremity of said plow frame from said main frame; a chain frame positioned within said plow frame and hingedly supported adjacent its rearward extremity; adjustable means for supporting the forward extremity of said chain frame; an endless chain supported by said chain frame; gripping jaws on said chain adapted to engage the tops of the beets as they are dug by said plows; and a track adapted to be engaged by said chain so as to guide the latter in a predetermined path.

4. A beet harvesting machine comprising: a main wheeled frame; a plow frame positioned within said main frame; said plow frame being hinged to said main frame adjacent its rearward extremity; plows depending from said plow frame; adjustable means for supporting the forward extremity of said plow frame from said main frame; a chain frame positioned within said plow frame and hingedly supported adjacent its rearward extremity; adjustable means for supporting the forward extremity of said chain frame; an endless chain supported by said chain frame; gripping jaws on said chain adapted to engage the tops of the beets as they are dug by said plows; a track adapted to be engaged by said chain so as to guide the later in a predetermined path; and a topping mechanism positioned in said path so as to top said beets as they travel along said track.

5. A beet harvesting machine comprising: a main wheeled frame; a plow frame positioned within said main frame; said plow frame being hinged to said main frame adjacent its rearward extremity; plows depending from said plow frame; adjustable means for supporting the forward extremity of said plow frame from said main frame; a chain frame positioned within said plow frame and hingedly supported adjacent its rearward extremity; adjustable means for supporting the forward extremity of said chain frame; an endless chain supported by said chain frame; gripping jaws on said chain adapted to engage the tops of the beets as they are dug by said plows; a track adapted to be engaged by said chain so as to guide the latter in a predetermined path; a topping mechanism positioned in said path so as to top said beets as they travel along said track, said topping mechanism comprising, guide bars adapted to engage the tops of said beets; and rotating knives positioned at the rearward extremity of said guide bars so as to engage said beets as they pass therethrough.

6. A beet harvesting machine comprising: a main wheeled frame; a plow frame positioned within said main frame; said plow frame being hinged to said main frame adjacent its rearward extremity; plows depending from said plow frame; adjustable means for supporting the forward extremity of said plow frame from said main frame; a chain frame positioned within said plow frame and hingedly supported adjacent its rearward extremity; adjustable means for supporting the forward extremity of said chain frame; an endless chain supported by said chain frame; gripping jaws on said chain adapted to engage the tops of the beets as they are dug by said plows; a track adapted to be engaged by said chain so as to guide the latter in a predetermined path; a topping mechanism positioned in said path so as to top said beets as they travel along said track, said topping mechanism comprising, guide bars adapted to engage the tops of said beets; rotating knives positioned at the rearward extremity of said guide bars so as to engage said beets as they pass therethrough; and an endless chain driving each of said knives there being one of said chains at each side of the path of said beets, said latter chains engaging said beets and forcing them toward said knives.

7. A chain-carried, gripping device for beet harvesters comprising: a chain link; an arm hinged at each side of said chain link; co-acting gripping jaws carried at the extremities of said arms; means for forcing said arms toward each other so that said gripping jaws will grip the top of a beet at a previously determined point in the travel of said chain, said arms having resilient material incorporated therein so as to cushion the action of said gripping jaws.

In testimony whereof. I affix my signature.

HENRY M. SIEMANN.